US012764832B2

(12) United States Patent
Bisht et al.

(10) Patent No.: US 12,764,832 B2
(45) Date of Patent: Oct. 13, 2026

(54) SYSTEM AND METHOD FOR FACILITATING MACHINE TO MACHINE COMMUNICATION

(71) Applicant: JIO PLATFORMS LIMITED, Ahmedabad (IN)

(72) Inventors: Birendra Singh Bisht, Navi Mumbai (IN); Harbinder Pal Singh Saini, Navi Mumbai (IN); Anurag Sinha, Mumbai (IN); Abhay Kumar, Dombivli East (IN); Amit Kumar Gupta, Dombivli East (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 650 days.

(21) Appl. No.: 18/247,470

(22) PCT Filed: Mar. 16, 2023

(86) PCT No.: PCT/IB2023/052582
§ 371 (c)(1),
(2) Date: Mar. 31, 2023

(87) PCT Pub. No.: WO2023/187536
PCT Pub. Date: Oct. 5, 2023

(65) Prior Publication Data
US 2025/0016884 A1 Jan. 9, 2025

(30) Foreign Application Priority Data
Mar. 30, 2022 (IN) ............................. 202221018950

(51) Int. Cl.
*H04W 76/40* (2018.01)
*H04W 4/12* (2009.01)
*H04W 4/70* (2018.01)

(52) U.S. Cl.
CPC ............. *H04W 76/40* (2018.02); *H04W 4/12* (2013.01); *H04W 4/70* (2018.02)

(58) Field of Classification Search
CPC ........... H04W 4/08; H04W 4/12; H04W 4/70; H04W 8/186; H04W 48/18; H04W 76/40
See application file for complete search history.

(56) References Cited

U.S. PATENT DOCUMENTS 8,504,635 B2 8/2013 Benco et al.
9,385,879 B2 * 7/2016 Kim ...................... H04L 12/189
(Continued)

FOREIGN PATENT DOCUMENTS

KR 20150060248 A 6/2015
KR 101924073 B1 11/2018

OTHER PUBLICATIONS

International Search Report, PCT/IB2023/052582, mailed Jul. 21, 2023, Total Pages 03.

*Primary Examiner* — Jeong S Park
(74) *Attorney, Agent, or Firm* — FINNEGAN, HENDERSON, FARABOW, GARRETT & DUNNER LLP

(57) ABSTRACT

The present disclosure provides a system and a method that facilitate establishment of an effective machine to machine (M2M) communication in a network. The system and method may provide a series of instructions to provide an efficient and effective communication between two or more machines without loss of information through a converge telephony application server (CTAS) operatively coupled to a next generation telecommunication network.

39 Claims, 6 Drawing Sheets

(56) References Cited

U.S. PATENT DOCUMENTS

| | | | | |
|---|---|---|---|---|
| 2003/0059015 | A1* | 3/2003 | Eber | H04M 3/56 379/201.02 |
| 2013/0003972 | A1* | 1/2013 | Kang | H04L 9/0833 726/4 |
| 2013/0265932 | A1* | 10/2013 | Huang | H04W 76/19 370/312 |
| 2013/0339438 | A1* | 12/2013 | Cherian | H04W 4/08 709/204 |
| 2014/0213252 | A1* | 7/2014 | Jung | H04W 4/08 455/435.1 |
| 2015/0098394 | A1* | 4/2015 | Corcoran | H04W 88/16 370/329 |
| 2015/0189459 | A1* | 7/2015 | Aon | H04W 4/70 455/558 |
| 2017/0006522 | A1* | 1/2017 | Nishimura | H04W 4/08 |
| 2018/0069813 | A1 | 3/2018 | Tevonian et al. | |
| 2018/0310141 | A1* | 10/2018 | Yin | H04L 12/189 |
| 2018/0332463 | A1 | 11/2018 | Castellanos Zamora et al. | |

* cited by examiner

SYSTEM AND METHOD FOR FACILITATING MACHINE TO MACHINE COMMUNICATION

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The patent document includes systems and methods as defined in 3GPP Technical Specification (TS).

FIELD OF INVENTION

The present invention relates generally to telecommunication systems, and more particularly to next generation machine to machine communication.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In recent years, collaborative communication between numerous intelligent systems through either mobile or fixed networks has achieved significant importance. One of the resultant emerging domains is machine-to-machine (M2M) communication. M2M communication describes a communication style in which two or more entities such as devices/machines communicate with each other autonomously. M2M communication is playing a promising role in enabling the Internet of Things (IoT) vision by providing ubiquitous connectivity between numerous intelligent devices. The term M2M in IoT describes the autonomous exchange of information among numerous devices interconnected with each other. M2M communication thus covers a wide range of use cases. For instance, the M2M application area includes intelligent transportation systems (ITS), logistics and supply chain management, smart metering, e-healthcare, surveillance and security, smart cities, and home automation. Particularly, many intelligent devices are expected to be deployed in the automotive sector, security, e-healthcare, and logistics. Consequently, M2M communications are anticipated to reshape the business/revenue of telecom operators, M2M enterprises, and M2M enablers due to the emerging use of intelligent sensors and actuators in many advanced aforementioned applications.

Nevertheless, M2M communications pose significant challenges to mobile networks, for example, due to the expected large number of devices with simultaneous access for sending small-sized data, and a diverse application range.

There is, therefore, a requirement in the art for an effective and economical system and method that can overcome aforementioned problems in the art and can effectively enable a faster, effective and next generation-based Machine to Machine (M2M) communication.

Objects of the Present Disclosure

Some of the objects of the present disclosure, which at least one embodiment herein satisfies are as listed herein below.

It is an object of the present disclosure to facilitate an effective, concurrent and improved communication between two or more machines.

It is an object of the present disclosure to allow machines to initiate and receive calls.

It is an object of the present invention to provide for an efficient and effective communication between two or more machines without loss of information.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present invention provides a system and method for facilitating machine to machine (M2M) communication in a network. The system may include at least one converge telephony application server (CTAS) in communication with one or more network devices associated with the network, and a centralized database. The at least one CTAS may be operatively coupled to a processor, the processor may be further coupled to a memory, the memory storing instructions on execution of which, the processor causes the at least one CTAS to: receive one or more predefined request signals from a network device having a predefined M2M number; identify, based on a pre-defined set of instructions, if the predefined M2M number belong to a unique group of numbers, wherein only the unique group of numbers avail a plurality of services associated with M2M communication; invoke, based on the identification, a call leg to initiate communication with the respective plurality of services; and based on the invoked call leg, establish by the centralized server, a simultaneous communication of the network device with the plurality of services.

In an embodiment, the CTAS may be further configured to capture a calling service in a first database and capture a messaging service in a second database during the invoked call leg.

In an embodiment, the M2M number has a pre-defined length, the pre-defined length includes a Mobile Station International Subscriber Directory Number (MSISDN) ID and a respective country code.

In an embodiment, the unique group of numbers are stored in a database, each number in the unique group of numbers is associated with a unique user ID, wherein the unique group of numbers are privileged with incoming and outgoing calls.

In an embodiment, the unique group of numbers are stored in a pre-defined format that comprises international ID, mobile numbers and fixed-line numbers.

In an embodiment, the database comprises pre-defined number of identities associated with a pre-defined service for the unique group of numbers.

In an embodiment, if no identity is defined under a pre-defined service, then an M2M number is allowed to access the pre-defined service wherein incoming calls to the M2M number is allowed from any number.

In an embodiment, an M2M number has a predefined Registration and Call flow process.

In an embodiment, a predefined caller ring back tone (CRBT) service is applicable for the M2M number.

In an embodiment, one or more predetermined services are prevented being associated with an M2M number though flagging predetermined instances associated with the one or more predetermined services.

In an embodiment, roaming facilities are unavailable to an M2M number in any network.

In an embodiment, when a network device with an M2M number dials any valid number, the CTAS checks a called-party number in the database, wherein if the valid number is found in the database, the CTAS provides call routing treatment.

In an embodiment, when a network device with an M2M number dials any invalid number, call will be rejected with an error code.

In an embodiment, if outgoing call is barred for an M2M number, the CTAS responds with a Decline with a pre-defined announcement, wherein the predefined announcement is mapped with a predetermined internal cause code.

In an embodiment, when a network device associated with the entity dials an M2M number, at the originating leg, the CTAS queries a Mobile number portability (MNP) of the dialed M2M number.

In an embodiment, the query to the MNP returns a domain name of the M2M subscriber, wherein if location routing number (LRN) is not returned by the MNP, the CTAS does not provide Network-Provided-Routing-Information (NPRI) in the centralized database.

In an embodiment, if an M2M number belongs to a second entity, the MNP query is skipped and the CTAS routes the call to the pre-defined service.

In an embodiment, a pre-defined priority service is available for network devices with the M2M numbers.

In an embodiment, the CTAS does not perform CS Domain Routing Number (CSRN) query if an M2M user is not-registered or not-reachable.

In an aspect, the method for facilitating machine to machine (M2M) communication of an entity in a network. The method may include the step of receiving, by at least one converge telephony application server (CTAS), one or more predefined request signals from a network device having a predefined M2M number. In an embodiment, the CTAS is in communication with one or more network devices associated with the network, and a centralized database. The method may further include the step of identifying, by the CTAS, based on a pre-defined set of instructions, if the predefined M2M number belong to a unique group of numbers. In an embodiment, only the unique group of numbers avail a plurality of services associated with M2M communication. The method may further include the step of invoking, by the CTAS, based on the identification, a call leg to initiate communication with the respective plurality of services, and establishing, by the centralized server, based on the invoked call leg, a simultaneous communication of the network device with the plurality of services.

In an aspect, a user equipment (UE) may be communicatively coupled with at least one converge telephony application server (CTAS) and the CTAS coupling may include the steps of receiving a connection request from the UE for dialling an M2M number, sending an acknowledgment of the connection request to the CTAS and transmitting a plurality of signals in response to the connection request.

In an aspect, a non-transitory computer readable medium comprising machine executable instructions that are executable by a processor may be configured to receive one or more predefined request signals from a network device having a pre-defined M2M number, identify, based on a pre-defined set of instructions, if the predefined M2M number belong to a unique group of numbers, wherein only the unique group of numbers avail a plurality of services associated with M2M communication; invoke, based on the identification, a call leg to initiate communication with the respective plurality of services; and further based on the invoked call leg, establish by the centralized server, a simultaneous communication of the network device with the plurality of services.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The present system and method facilitate to overcome the above mentioned problems by enabling establishment of an effective machine to machine (M2M) communication in a network. The system and method may provide a series of instructions to provide for an efficient and effective communication between two or more machines without loss of information.

Figure 1A:
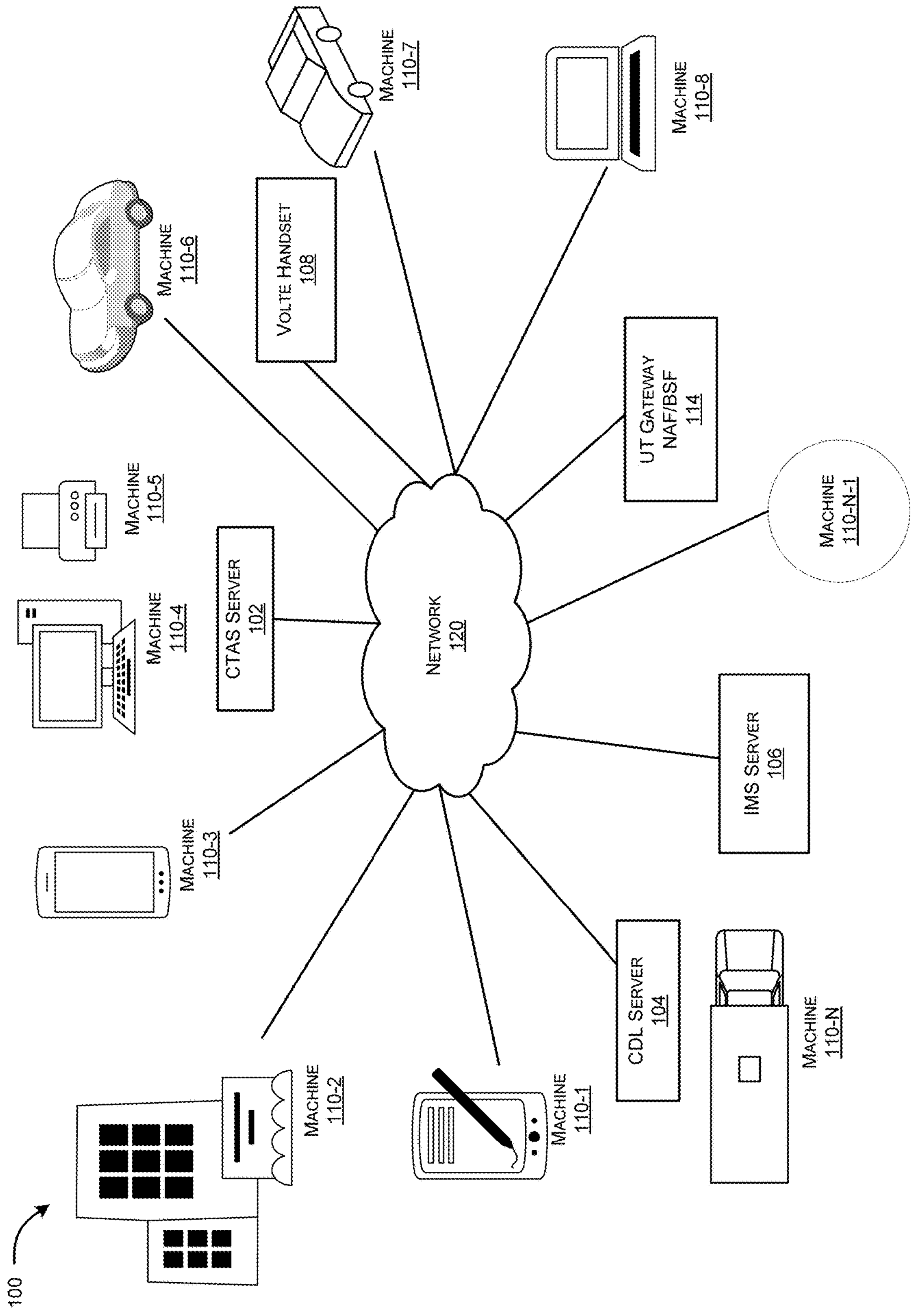
FIGS. 1A-1B illustrate exemplary network architecture in which or with which system of the present disclosure can be implemented, in accordance with an embodiment of the present disclosure.
Figure 1B:
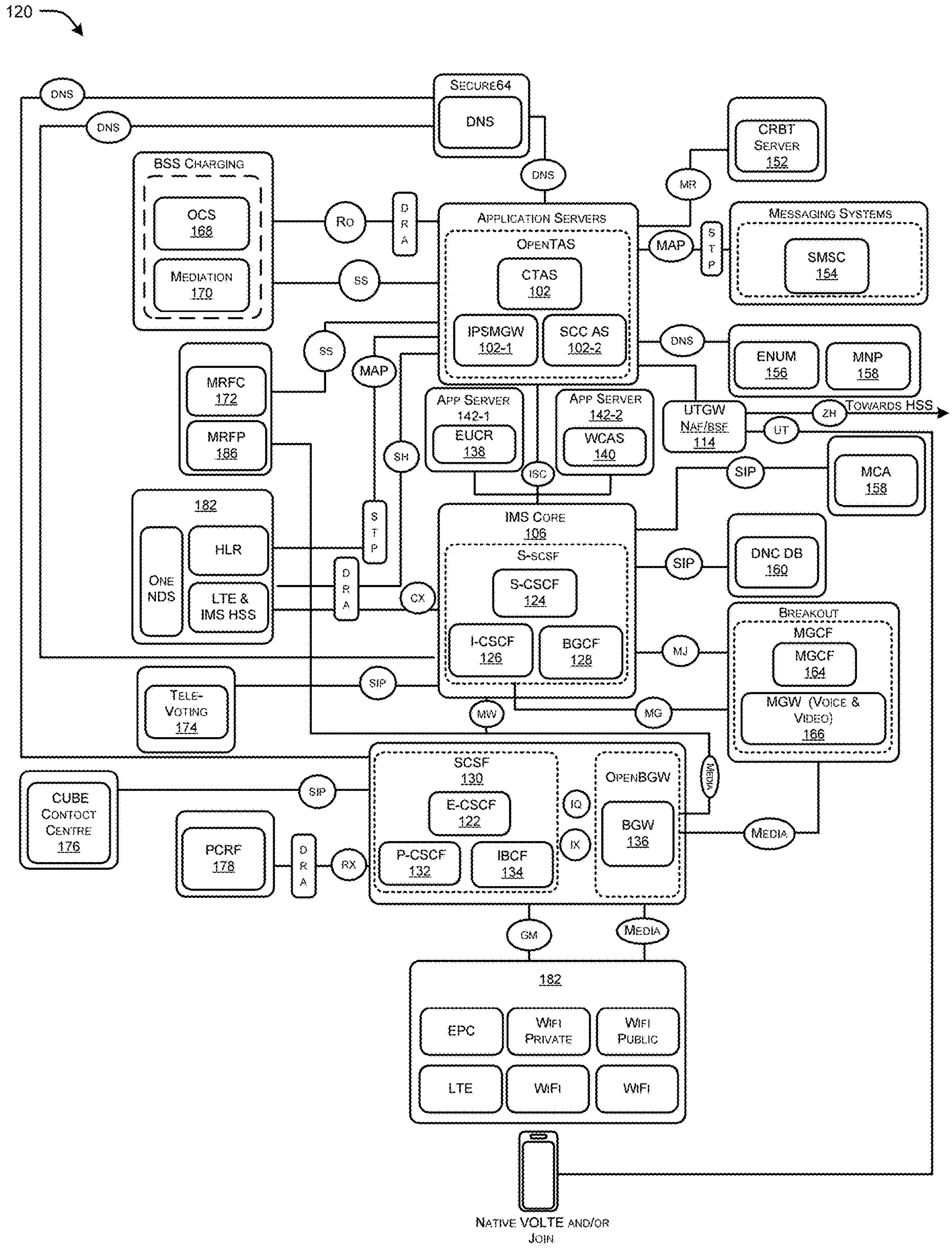

FIGS. 1A-1B illustrate exemplary network architecture 100 and 120 in which or with which system of the present disclosure can be implemented, in accordance with an embodiment of the present disclosure. As illustrated in representation 100 in FIG. 1A, a network device 102 (network device hereinafter interchangeably referred to as converge telephony application server or CTAS 102) may be configured to facilitate a plurality of machine to machine (M2M) devices (110-1, 110-2, 110-3, . . . 110-N) (herein referred collectively as M2M devices 110 or M2M device 110 individually) to communicate with each other. The M2M devices may include one from a user device, a user equipment, an automotive vehicle, a smart home appliance, a smart industrial appliance, the web, a cellular phone, a tablet computer, a personal digital assistant (PDA), a personal computer (PC), a laptop computer, a media centre, a work station and other such devices. The network device 102 may be configured as an application server and may be communicably operational or may be integrated with the Internet Protocol Multimedia Subsystem (IMS) server 106 (also interchangeably referred to as IMS or IMS core). The IMS server 106 may pertain to a vendor or service provider to enable a user device 110 to establish simultaneous communication with plurality of emergency services. In an embodiment, the CTAS or the network device 102 may be implemented in an existing IMS implementation to facilitate network service corresponding to communication network 112. In an example, the communication network 112 may pertain to, for example, fifth generation (5G) network service.

The M2M device 110 may be at least one of a wireline device or wireless device and may be associated with an M2M number.

In an embodiment, the communication network 112 pertaining to CTAS based IMS implementation may be a 5G network that may include at least one of a wireless network, a wired network or a combination thereof. The communication network 112 may be implemented as one of the different types of networks, such as Intranet, Local Area Network (LAN), Wide Area Network (WAN), Internet, and the like. Further, the network can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Application Protocol (WAP), Automatic repeat request (ARQ), and the like. In an embodiment, the communication network 112 may pertain to a 5G network that may be facilitated through, for example, Global System for Mobile communication (GSM) network; a universal terrestrial radio network (UTRAN), an Enhanced Data rates for GSM Evolution (EDGE) radio access network (GERAN), an evolved universal terrestrial radio access network (E-UTRAN), a WIFI or other LAN access network, or a satellite or terrestrial wide-area access network such as a wireless microwave access (WIMAX) network. In an example embodiment, the communication network may enable 5G or 6G network based on subscription pertaining to the user/user device and/or through a Subscriber Identity Module (SIM) card. Various other types of communication network or service may be possible.

In an example, the communication network 112 may utilize different sort of air interface, such as a code division multiple access (CDMA), time division multiple access (TDMA), or frequency division multiple access (FDMA) air interface and other implementation. In an example embodiment, the wireline user device may use wired access networks, exclusively or in combination with wireless access networks, for example, including Plain Old Telephone Service (POTS), Public Switched Telephone Network (PSTN), Asynchronous Transfer Mode (ATM), and other network technologies configured to transport Internet Protocol (IP) packets.

As shown in FIG. 1B, in an example, the CTAS (102) may be session initiation application (SIP) server that is a 3GPP and RFC compliant implementation of LTE service architecture. The CTAS at the centre of a voice core network (120), managing the connectivity between subscribers and the implementation of supplementary services. The CTAS (102) may further be operatively coupled to a Call Session Control Functions (E-CSCFs) (122) that controls every service in an all-IP network and makes possible new subscriber services such as VOLTE, VoWiFi, RCS and WebRTC. AnRo interface based online charging, OCS (168) may be implemented in the telecom network. One or more charging data records (CDRs) generated by application servers, such as CTAS, can be used by a Mediation system (170) for reconciliation purpose. The CTAS (102) may further be operatively coupled to a call forwarding vertex (CFX) (122) that controls every service in an all-IP network and makes possible new subscriber services such as VOLTE, VoWiFi, RCS and WebRTC. For example, the CFX can act as a central control core that can offer session and service control, using predefined interfaces and application triggering mechanisms. One or more access elements and clients such as VOLTE Devices and operator 4G Voice Client (166) may be further associated with the CTAS (102). In an example, The CTAS (102) may be further coupled to an Element Management System (EMS) that can manage specific types of one or more network elements (172, 174, 176) within a telecommunication management network (TMN). A Centralised Data Layer (CDL) (104) may further be operatively coupled to the CTAS (102). In an example, the CDL can maintain a mapping table between an ECI and Short-Distance Charging Area (SDCA) of a circle. During application commissioning process, the CDL instance of the circle (MNC) will download cell-id vs SDCA mapping table of the circle (MNC) from the centralized database. In an example, a UtGW (NAF and BSF) (114) provides a gateway to one or more networks for providing application-independent functions for mutual authentication of a user equipment and servers unknown to each other and for 'bootstrapping' the exchange of secret session keys afterwards. This allows the use of additional services like Mobile TV and PKI, which need authentication and secured communication. For example, the BSF is introduced by the application server (NAF), after an unknown UE device is trying to get service access: the NAF refers the UE to the BSF. The UE and the BSF mutually authenticate via 3GPP protocol AKA (Authentication and Key Agreement); additionally, the BSF sends related queries to the Home Subscriber Server (HSS). Afterwards, the UE and the BSF agree on a session key to be used for encrypted data exchange with the application server (NAF). When the UE again connects to the NAF, the NAF is able to obtain the session key as well as user-specific data from the BSF and can start data exchange with the end device (UE), using the related session keys for encryption.

The IMS server (106 of FIG. 1A and FIG. 1B) may include one or more modules or components that may enable to perform one or more functions. For example, the IMS server may be an existing IMS core including components/modules handling various functions such as, serving-call session control function (S-CSCF) module 124, interrogating call session control function (I-CSCF) module 126, proxy-call session control function (P-CSCF) module 128. In an embodiment, the CTAS 102 may be integrated with a network of the IMS core and other application servers to provide a network service such as for example, a fifth generation (5G) network and may include a telephony application server (TAS), which may be considered as a general component used in a communication network to provide telephony applications and additional multimedia functions. In another example, the other application server may include Mobile number portability (MNP) server 158, which may provide number portability to users such as, for example, may allow retaining same number upon change in service provider. In an yet another example, another application server may include a Short Message Service Center (SMSC) (154) that may store, forward, convert and deliver Short Message Service (SMS) messages. Various other servers may be integrated to the CTAS enabled IMS implementation for enabling one or more services pertaining to communication network or 5G network.

In an embodiment, the network device or CTAS 102 may be communicably coupled or be integrated with one or more functional components such as, for example, a session initiation protocol (SIP) based application server.

Further, as shown in FIG. 1B, to provide various aspects of the network service (such as 5G network), the components of IMS server (such as S-CSCF, I-CSCF module) may also include components/modules that pertain to functions, for example, breakout gateway control function (BGCF) module 128, a media gateway control function (MGCF) module 164, interconnect border control function (IBCF) 134 and other components/modules. In general implementation, the BGCF module 128 may enable routing call signalling to and from the most appropriate S-CSCF module 124. In the present implementation, the BGCF module 128 may enable to route the call to respective CTAS 102 for establishing routing of L1 numbers. The CFX module (122) may further include an Emergency-Call Session Control Function (130). The E-CSCF (130) is a specialist platform which is designed to facilitate support for emergency services dialling. In this capacity, the E-CSCF will take in requests from the P-CSCF (132) and S-CSCF (124) and route these emergency session requests to a suitable onward destination such as a PSAP (Public Safety Answering Point). Further, in general, the MGCF module 164 may be a SIP endpoint that can interface with security gateway (SGW) and may also control resources in media gateway (MGW) 166. The IBCF module 134 may enable boundary control between various service provider networks, thus providing CTAS enabled IMS network security in terms of signalling information. The IMS server may also include other existing components such as for example a component pertaining to Mobile Communications on board Aircraft (MCA) (160) that enables passengers to use their mobile phone on board an aircraft. A miniature cellular network is installed inside the aircraft. Mobile phones can connect to this network. Further, as shown in FIG. 1B, as the CTAS-IMS based implementation may be associated with another application server such as a Caller Ring Back Tone (CRBT) server (152) that allows the caller to hear subscriber pre-defined song or audio clip instead of standard Ring tone until the subscriber picks up the call.

In an embodiment, CTAS (102) may be capable of handling VOLTE, M2M, Fixed-line (FLP) and Enterprise subscribers simultaneously. This makes CTAS a unique type of TAS which gives operational and engineering advantage to in managing the subscriber's growth in VOLTE, Fixed and Enterprise domain in most efficient way. In another embodiment, the CTAS (102) can be integrated with the NSN CSCFs for delivering MMTel Supplementary services to the VOLTE customers as well as to the customers who are using 4G Voice client over LTE or WiFi. The CTAS can support online and offline charging for subscribers. The CTAS (102) may further include IP Short Message Gateway (IPSMGW) that can handle SIP based messaging services for IMS subscribers. In addition, the IP-SM-GW will interact with the legacy SMSC (154) using MAP signalling in order to allow IMS to SMS conversion and distribution. The CTAS (102) may further include, but not limited to a service Centralization and Continuity Application Server (SCC AS). The SCC AS can acts as a back-to-back user agent (B2BUA) within the IMS architecture and can facilitate service centralization, as well as coordination of Single Radio Voice Call Continuity (SR-VCC) handover procedures.

Figure 2A:
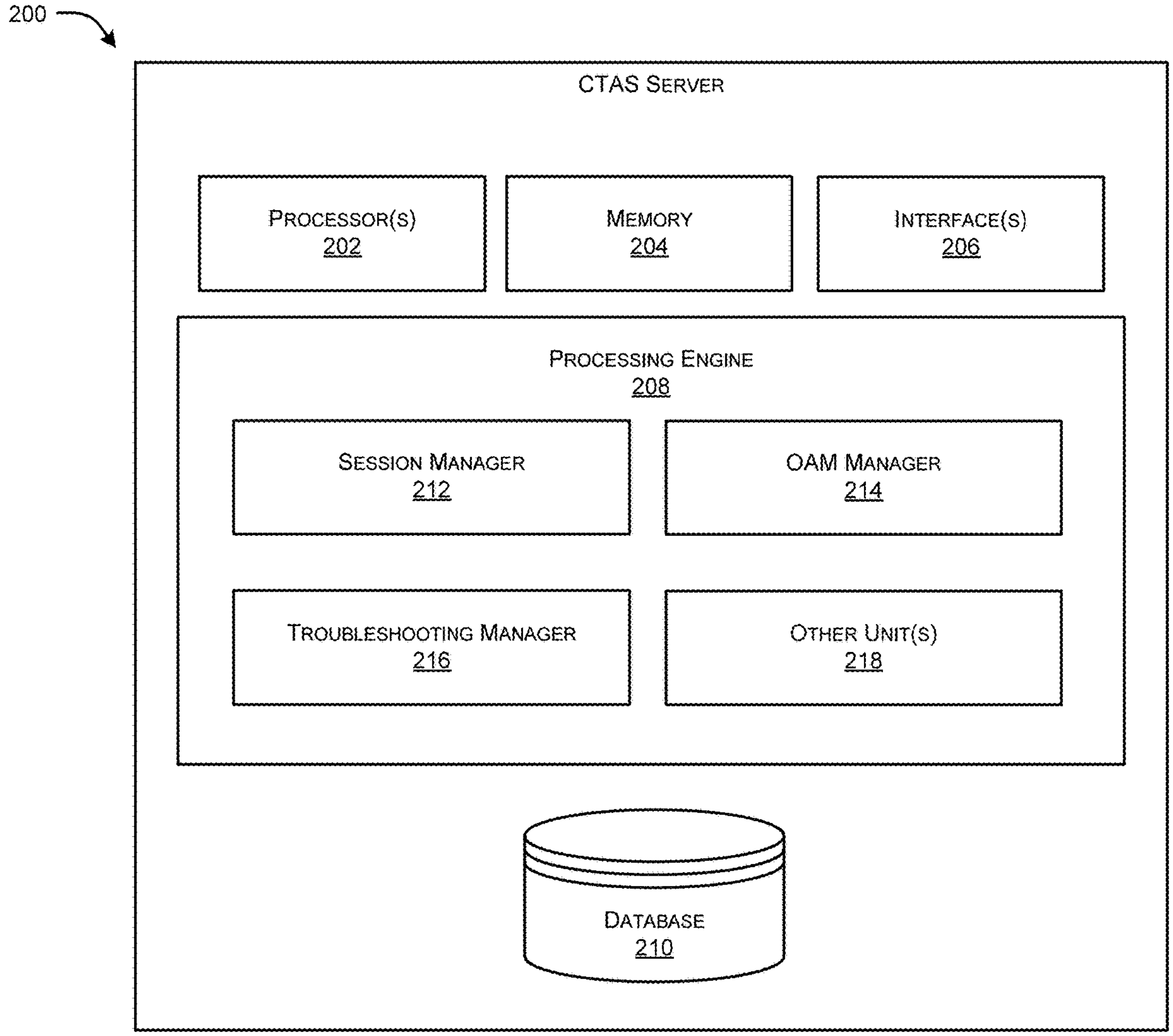
FIGS. 2A-2B with reference to FIG. 1A, illustrates an exemplary representation of a network device, in accordance with an embodiment of the present disclosure.

The system may facilitate the simultaneous communication by a combination of hardware and software implementation. FIG. 2A with reference to FIG. 1A, illustrates an exemplary representation of a network device, in accordance with an embodiment of the present disclosure. The system includes the network device or CTAS 102 that may include one or more processors. The network device or CTAS 102 may be integrated with IMS server 106 to provides a network service to a user device 110 (as shown in FIG. 1A). In an aspect, the network device 102 may include one or more processor(s) 202 coupled with a memory 204. The memory 204 may store instructions which when executed by the one or more processors may cause the system to perform the steps as described herein. The network device or CTAS 102 may cause the system to receive, through the IMS (106 of FIG. 1A), a request for routing a M2M number in anticipation of at least one incoming communication from the UE (102).

In an example, one or more CTAS instances may be deployed in a super-Core of the network architecture. Each CTAS instance may be dedicated to handling traffic of a predefined circle. Further, a plurality of CTAS clusters may be used to serve traffic of a single circle and each circle may have its own CDL module. In an embodiment, the CTAS (102) may be configured to store a set of M2M numbers (simply referred to as M2M numbers herein) that can be allowed to initiate and receive calls to and from at least four end points of at least two circles, for example circle A or party A and circle B or party B.

The system can support the following:

- at least 4 B-party numbers for example 10-digit Mobile/Fixed Numbers for outgoing calls originating from a 13-digit IoT Number of A circle.
- at least 4 A-party numbers for example 10-digit Mobile/Fixed Numbers for incoming calls coming to the 13-digit IoT Number of the B circle
- At least 4 B-party numbers for example 10-digit Mobile/Fixed Numbers for outgoing SMS originating from 13-digit IoT Number of the A circle
- At least 4 A-party numbers (10-digit Mobile/Fixed Numbers) for incoming SMS coming to the 13-digit IoT Number of the B circle In an example, the numbers can be unique and are configurable through a Move, Add, Change, or Delete (MACD) set of instructions. The M2M numbers can be applied on all the 13-digit Mobile Station International Subscriber Directory Number (MSISDN) provided to a user or can be unique for each 13-digit MSISDN. In an example, the M2M numbers can be mobile and fixed-line. In an example, the 10-digit Mobile Numbers configured for restricted voice and SMS calls can be local or international numbers as per the current telco regulations. Any number not belonging to the following groups may be an invalid number.

In an example, the peer to peer (P2P) services will work for 13-digit Numbers even while roaming. If no B-Party number is defined for 13-digit MSISDN in the P2P Services (Voice and SMS) template, then the P2P services will be barred. The P2P services, if required in the future for NB-IoT, will follow the MACD set of instructions and will be raised as a separate requirement In an example, the M2M numbers may be in a predefined format. For example, the predefined numbering format may be but not limited to an international format such as "+<CC><MSISDN>".

Further, the M2M numbers may include the following plurality of services:

- One or more operator Join services may not be applicable to M2M/IoT. In an exemplary implementation, announcement may be required for one or more blocked calls for the M2M numbers for both incoming and outgoing calls.
- A set of Standard Cause Codes of voice, SMS services and CRBT services may be applicable to the M2M numbers. Supplementary services such as call forwarding, call conference, call waiting, call hold, missed call alert and the like will be barred for M2M subscribers. The network must support call-hold request initiated from other devices to the M2M users. International roaming may be barred for the M2M numbers
- Mobile number portability (MNP) may not be applicable for the M2M numbers of a second set of operators not associated with the network.
- OFFNET M2M numbers may be routed to the second set of operators without Location Routing Number (LRN).
- The M2M devices will follow 3GPP/GSMA specifications for VOLTE registration and call/SMS service.
- Video Call service not applicable for M2M numbers.
- Priority service (Multimedia Priority Service) are applicable for M2M numbers.
- Call/SMS barring as and when enforced by appellate authority (DOT) for VOLTE will be applicable for M2M numbers as well.
- 13-digit M2M/IoT numbers will be allowed to call emergency numbers like police, fire, ambulance etc.
- Application to peer (A2P) transactional/promotional messages are allowed for the M2M numbers for long code, short code and calling line identification (CLI).

In an embodiment, the CTAS (102) may be configured to determine a calling party and a called party based on a local configuration where the M2M number series may be defined as Mobile or PSTN. For identification of the M2M numbers, a multi-channel hybrid medium access control (MCHM) and multi charging hybrid function (MCHF) may be utilized by the CTAS (102). The MCHM may signify the M2M users of a predefined network and the MCHF may signify the M2M users of a second set of operators. A minimum length and a maximum length of the M2M user of the Mobile Station International Subscriber Directory Number (MSISDN) may be a predefined number. For example, the MSISDN number may be 15 including country code.

In an embodiment, the CTAS (102) may store in a repository an M2M-Data comprising a list of allowed user-identities from and to which incoming and outgoing calls may be allowed. In an example, the user identities may be stored in an international format but not limited to it. The user identities defined in each sub-tree may be different. In an embodiment, at least unique numbers can be configured in each sub-tree. For example, a maximum of 16 unique identities can be defined in total. Alternatively, if there are no user identities defined under a predefined service such as but not limited to Incoming-Allowed-Number under Voice-Data, then the M2M numbers may be allowed to access the predefined service. For example, incoming calls to the M2M number may be allowed from any number.

In an example, registration and Call flow for the M2M numbers may be same as VOLTE subscribers. The CTAS may issue an update request to a M2M Device. A storage class may include information regarding requirements for secure storage of data on the Device. After having authenticated and ensured that the M2M device is authorized to issue the request, the CTAS may execute the request. The CTAS may further check that the parameters of the request and store the request in the M2M Device otherwise, an exception may be returned). The update operation result may be returned to the CTAS. The status parameter may indicate that the actual operation execution has been delayed.

When the M2M device connects back to the M2M network (e.g., wakes up), it may retrieve pending requests from INBOX and process them. The call flows may be associated with each message. The status indication may be created by a trusted entity within the Device/Gateway and may be unique and verifiable.

In an embodiment, the CTAS (102) may be coupled to a predefined CRBT server. The said CRBT server may provide for one or more CRBT services to the M2M numbers. In an example, a Nat-ss-code value may be E if the M2M number avails a CRBT service.

In an embodiment, a plurality of supplementary services, except telecom infra project (TIP) and Originating Identification Presentation (OIP) may not be provided to the M2M users by configuring both operator and user flag as False in the MMTel-Service XML. An MCA service will not be configured in the MMTel-Service-Extra XML and international roaming may be blocked from a home location register (HLR) associated with the M2M number. In an example, IP Multimedia Private Identity (IMPI) may not be defined in a home subscriber station (HSS) of the network. In an embodiment, the M2M devices may not initiate a video call. For example, any incoming video call may be rejected either by responding with 488 or by setting video port as "0" in 200 OK of INVITE.

In an embodiment, if an M2M device dials any valid number, the CTAS (102) may check a called-party number against the valid number in the database or repository such as but not limited to the M2M-Data XML. If the valid number is found in the database, the CTAS (102) may provide call routing treatment as if the call is initiated from a 10-digit VOLTE number.

In an embodiment, the CTAS (102) may exclusively enable or disable call completion rate (CCR) for the M2M numbers based on a predefined set of instructions. The M2M number indication may be further added in a charging data record (CDR) by the CTAS (102). If, however, the M2M device dials any Invalid number, call will be rejected with but not limited to a SIP Error code 484. If an outgoing call is barred, the CTAS (102) may respond with a call declined announcement such as 603 Decline with appropriate announcement. In an example, the call declined announcement may be mapped with an internal cause code 1054.

In an embodiment, when VOLTE numbers dials a M2M number that is associated with an enterprise, at an originating leg, the CTAS (102) may perform an MNP query of the dialed M2M number. The MNP query may be responded with a return domain name of an M2M subscriber associated with the M2M number. An LRN may or may not be returned by the MNP query. If LRN is not provided, the CTAS (102) may not add a Network-Provided-Routing-Information (NPRI) attribute value pair (AVP) in the CCR. An online charging system (OCS) may be used for the Called-Party AVP to apply charging policy if any.

In an embodiment, if the dialed M2M number belongs to a second set of operators, the MNP query may be skipped. The CTAS (102) may route the call as if it is a PSTN number of the second set of operators.

In an embodiment, if a terminating TAS operatively coupled to the CTAS (102) may examine if a request uniform resource identifier (R-URI) or Previously-Served-User (P-served-user) contains any M2M number. If an M2M number is present in the P-Served-User, the CTAS (102) may check whether the M2M number can receive any incoming call from an identity present in information asserted identity (PAI) header. If the identity is not present in the database, M2M-Data, the CTAS (102) may reject the call with a call decline announcement such as a 603 Decline after rendering announcement. In an example, the call decline announcement is mapped to internal cause code 1055. If the identity of the user is present in the database, M2M-Data, the CTAS (102) may route the call as if the dialed number is a 10-Digit VOLTE number.

In an example, call barring as and when enforced by the appellate authority (DOT) for VOLTE will be applicable for the M2M numbers as well. The configuration of CTAS may be applicable for both VOLTE and M2M users. The M2M users can opt for priority service. The P-CSCF may add a priority header in a request signal such as the INVITE request originated from the M2M users based on which the CTAS (102) may apply priority service to the M2M user.

In an exemplary implementation, the system is tested with an operator home subscriber server (HSS). In case of the operator HSS, the operator HSS may only provide service-data corresponding to service indication in the M2M-data. For other service indications, repository data will be available but without service-data. In that case the CTAS (102) may consider default data present in the CTAS. The default data present in the CTAS (102) for the M2M user may be configured in such a way that:

Missed call alert (MCA) service will not be provisioned

Nat-ss-code value will be E.

No supplementary services other than TIP and OIP will be provided.

In an embodiment, the system may be flexible such that subsequently, if it is decided that a specific supplementary service needs to be added to a M2M user, then the M2M user may be provisioned with an appropriate service xml. In an example, the nomenclature of service xml must be same as the one currently being used for VOLTE devices.

If the M2M number wants to configure call forwarding (CF) services either via facility call or a utility interface, the CTAS (102) may be configured to reject the CFs. Since the M2M number is not allowed to roam in the network, the CTAS will not perform any CS Domain Routing Number (CSRN) query if the M2M user is either not-registered or not-reachable.

In an example, the one or more processor(s) 202 may be implemented as one or more microprocessors, microcomputers, microcontrollers, digital signal processors, central processing units, logic circuitries, and/or any devices that process data based on operational instructions. Among other capabilities, the one or more processor(s) 202 may be configured to fetch and execute computer-readable instructions stored in a memory 204 of the system 102. The memory 204 may be configured to store one or more computer-readable instructions or routines in a non-transitory computer readable storage medium, which may be fetched and executed to create or share data packets over a network service. The memory 204 may comprise any non-transitory storage device including, for example, volatile memory such as RAM, or non-volatile memory such as EPROM, flash memory, and the like.

In an embodiment, the CTAS 102 may include an interface(s) 206. The interface(s) 206 may comprise a variety of interfaces, for example, interfaces for data input and output devices, referred to as I/O devices, storage devices, and the like. The interface(s) 206 may facilitate communication of the CTAS 102. The interface(s) 206 may also provide a communication pathway for one or more components of the system 102. Examples of such components include, but are not limited to, processing engine(s).

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the system 102 may comprise the machine-readable storage medium storing the instructions and the processing resource to execute the instructions, or the machine-readable storage medium may be separate but accessible to the system 102 and the processing resource. In other examples, the processing engine(s) 208 may be implemented by electronic circuitry.

The processing engine 208 may include one or more components (as shown in FIG. 2A) including session manager (SM) 212, operations and maintenance (OAM) manager 214, and a troubleshooting manager (TM) 216. The SM 212 may act as core functional delivery module which may be responsible for call processing and service chaining logic execution in case of CTAS. The tasks of handling SIP, HTTP and Diameter messages are of the SM 212. The OAM manager 214 may be responsible for managing fault, configuration and performance aspects of the CTAS/network device. The OAM manager 214 may provide operations and maintenance touch point to the system or the CTAS 102. The OAM 216 may be integrated with EMS/OSS on a RESTful Interface. The TM 216 may aggregate logs and may debug information from all the functional managers for trouble shooting. The TM 216 may also provide flexibility to generate debug information, for example, in a Module wise, process wise, system wise manner. Various other functions of the components may be possible. In an embodiment, the database (210) may comprise data that may be either stored or generated as a result of functionalities implemented by any of the components of the processing engine(s) 208 of the system 102.

Figure 2B:
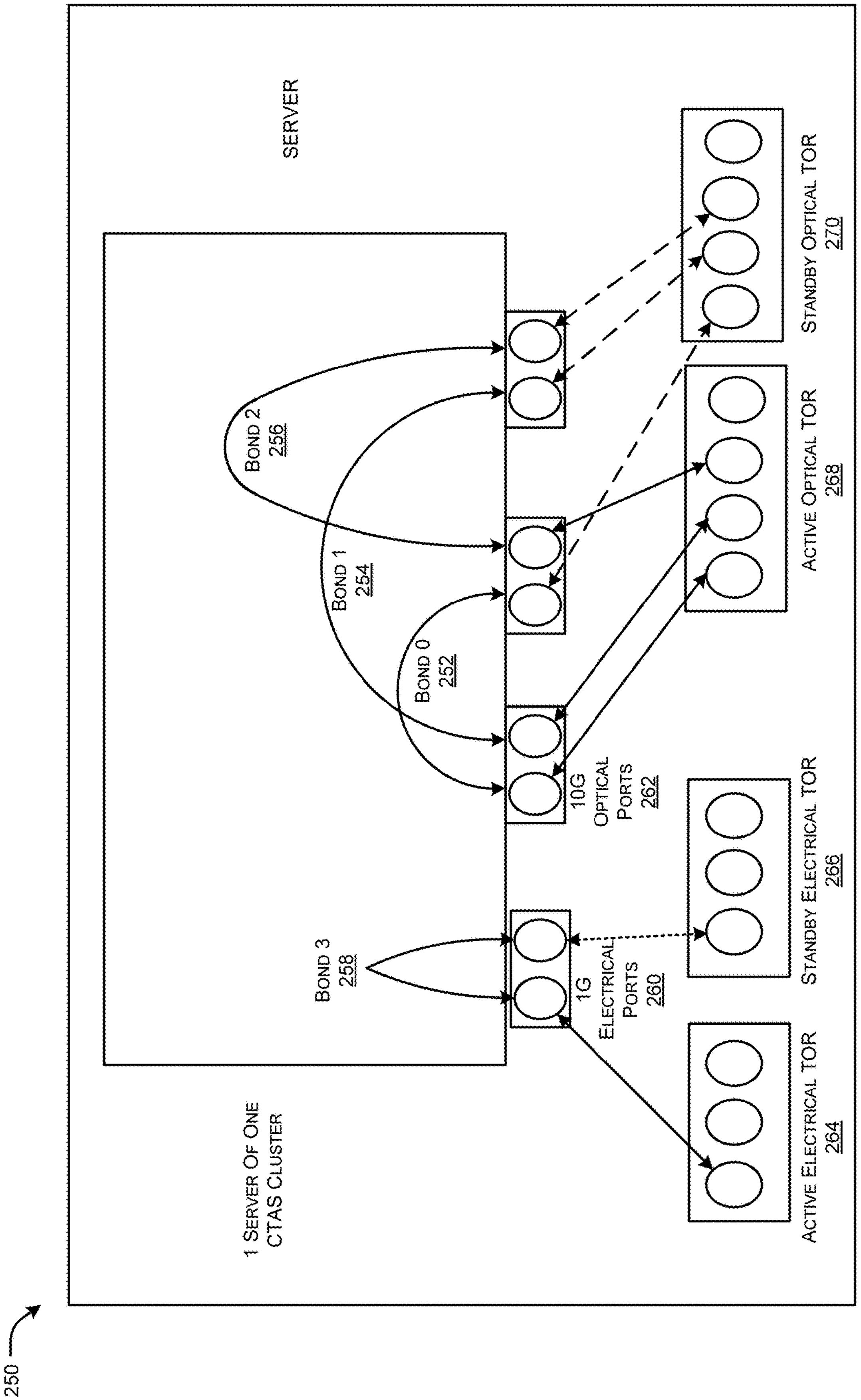

FIG. 2B illustrates exemplary representation of a CTAS server, in accordance with embodiments of the present disclosure. As shown in FIG. 2C, the CTAS server is a cluster-based solution, and can be hosted on one or more servers. Each server has at least four logical interfaces such as Bond0 (252), Bond1 (254), Bond2 (256) and Bond3 (258), where each Bond is a logically paired two ethernet ports to achieve link level redundancy. In an example, the Bond0 (252) interface may be used by at least eight blades for internal and database communication. The Bond1 (254) Interface can be used by SIP applications present in the at least eight servers for SIP signalling. The Bond2 (256) interface may be used for diameter communication by applications present in Blade3 onwards for example, from Blade3 to Blade8, whereas the Bond3 interface can be used communication with the Element Management System (EMS). In another example, for Bond0 (252), Bond1 (254) and Bond2 (256), 10G optical NIC cards (262) will be used, whereas for Bond3 (258), 1G electrical NIC cards (260) will be used.

The CTAS can support both IPv4 and IPv6 protocols, where the Bond2 (256) and the Bond3 (258) interfaces listen on either IPV6 or IPv4 at a given point of time and Bond1 interface listens on IPv4 and IPV6 at the same time. The Bond0 (252) interface, which is not used for any external communication supports only IPv4.

In an example, an M2M xml information, is given by

```
<M2M-Data>
  <Voice-Data>
    <Incoming-Allowed-Number>+917012140255,+188228822880,
  +914957961002, +919872000005 </Incoming-Allowed Number>
    <Outgoing-Allowed-Number>+917012140255,+188228822880,
  +914957961002, +919872000005 </Outgoing-Allowed Number>
  <Voice-Data>
    <SMS-Data>
    <Incoming-Allowed-Number>+917012140255,+188228822880,
  +914957961002, +919872000005 </Incoming-Allowed Number>
    <Outgoing-Allowed-Number>+917012140255,+188228822880,
  +914957961002, +919872000005 </Outgoing-Allowed Number>
    <SMS-Data>
<M2M-Data>
```

The xml information shows that the user identities defined in the XML information can contain international number, mobile number of other operators and fixed-line number of a first operator and a second set of operators.

Figure 3:
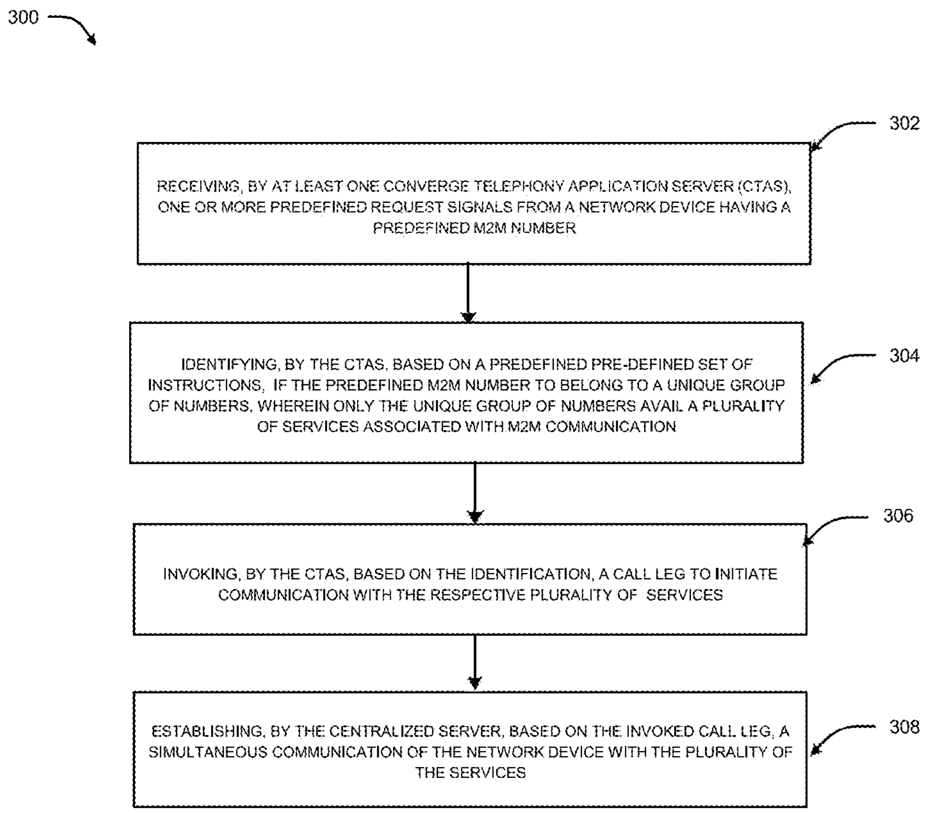
FIG. 3 illustrates an exemplary representation of flow diagram for facilitating machine to machine (M2M) communication in a network associated with an entity, in accordance with an embodiment of the present disclosure.

FIG. 3 illustrates an exemplary representation of flow diagram for facilitating machine to machine (M2M) communication in a network associated with an entity, in accordance with an embodiment of the present disclosure.

As illustrated, in an aspect, the method (300) for routing and handling level 1 (L1) numbers may include at 302, a step of receiving, by at least one converge telephony application server (CTAS) 102, one or more predefined request signals from a network device having a predefined M2M number. The CTAS 102 may be in communication with one or more network devices associated with the network, and a centralized database. In an example, one or more CTAS instances may be deployed in a super-Core of the network architecture. Each CTAS instance may be dedicated to handling traffic of a predefined circle. Further, a plurality of CTAS clusters may be used to serve traffic of a single circle and each circle may have its own CDL module.

The method further includes at 304, the step of identifying, by the CTAS, based on a pre-defined set of instructions, if the predefined M2M number to belong to a unique group of numbers, wherein only the unique group of numbers avail a plurality of services associated with M2M communication. In an embodiment, the CTAS (102) may be configured to store a set of M2M numbers (simply referred to as M2M numbers herein) that can be allowed to initiate and receive calls to and from at least four end points of at least two circles, for example circle A or party A and circle B or party B.

Furthermore, the method may include at 306, the step of invoking, by the CTAS, based on the identification, a call leg to initiate communication with the respective plurality of services. In an embodiment, when VOLTE numbers dials a M2M number that is associated with an enterprise, at an originating leg, the CTAS (102) may perform an MNP query of the dialed M2M number. The MNP query may be responded with a return domain name of an M2M subscriber associated with the M2M number. An LRN may or may not be returned by the MNP query. If LRN is not provided, the CTAS (102) may not add a Network-Provided-Routing-Information (NPRI) attribute value pair (AVP) in the CCR. An online charging system (OCS) may be used for the Called-Party AVP to apply charging policy if any.

Further, the method may include at 308, the step of establishing, by the centralized server, based on the invoked call leg, a simultaneous communication of the network device with the plurality of the services.

Figure 4:
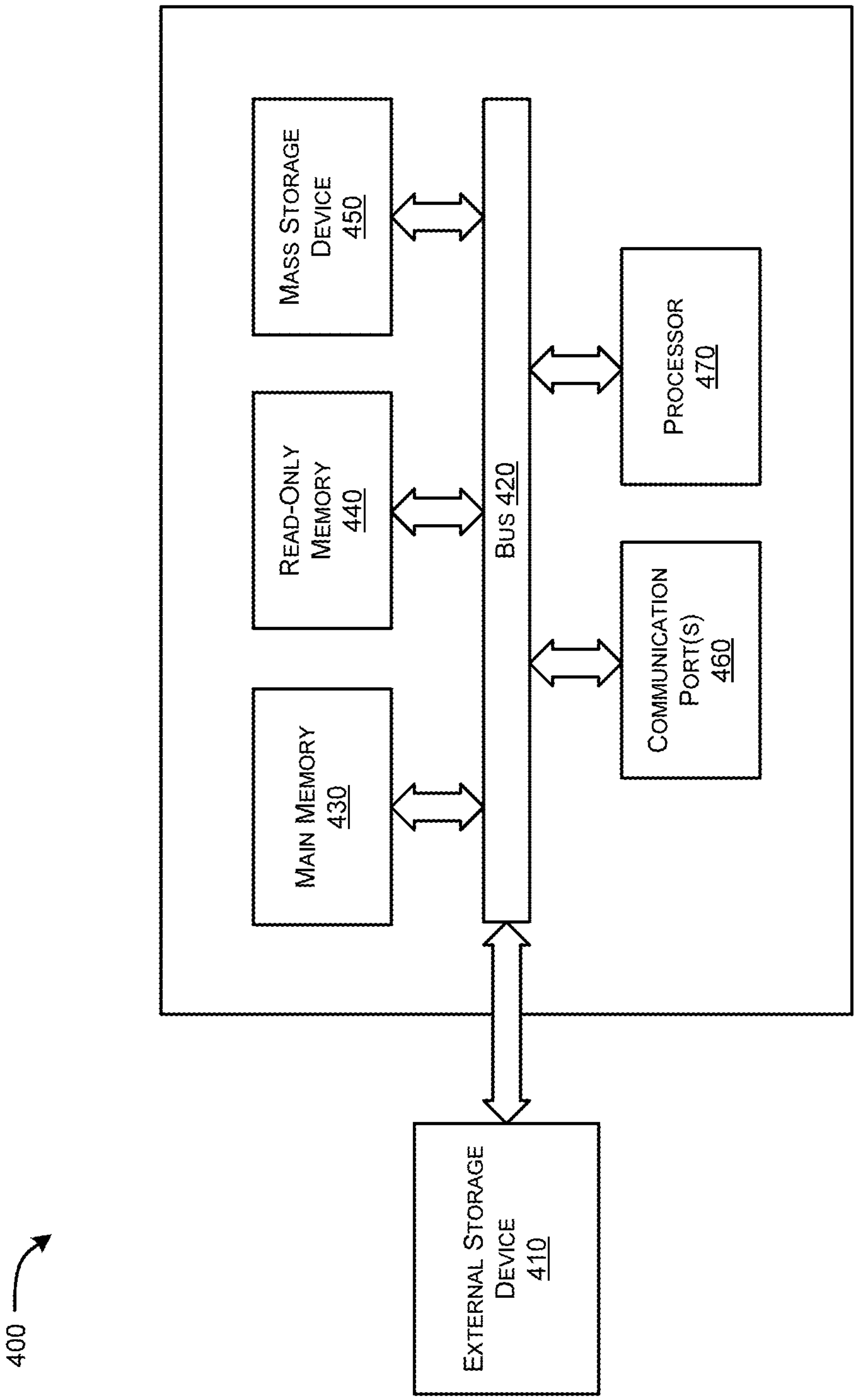
FIG. 4 illustrates an exemplary computer system in which or with which embodiments of the present invention can be utilized in accordance with embodiments of the present disclosure.

FIG. 4 illustrates an exemplary computer system in which or with which embodiments of the present invention can be utilized in accordance with embodiments of the present disclosure. As shown in FIG. 4, computer system 400 can include an external storage device 410, a bus 420, a main memory 430, a read only memory 440, a mass storage device 450, communication port 460, and a processor 470. A person skilled in the art will appreciate that the computer system may include more than one processor and communication ports. Processor 470 may include various modules associated with embodiments of the present invention. Communication port 460 can be any of an RS-232 port for use with a modem based dialup connection, a 10/100 Ethernet port, a Gigabit or 10 Gigabit port using copper or fibre, a serial port, a parallel port, or other existing or future ports. Communication port 460 may be chosen depending on a network, such a Local Area Network (LAN), Wide Area Network (WAN), or any network to which computer system connects. Memory 430 can be Random Access Memory (RAM), or any other dynamic storage device commonly known in the art. Read-only memory 440 can be any static storage device(s). Mass storage 450 may be any current or future mass storage solution, which can be used to store information and/or instructions.

Bus 420 communicatively couples processor(s) 470 with the other memory, storage and communication blocks.

Optionally, operator and administrative interfaces, e.g. a display, keyboard, and a cursor control device, may also be coupled to bus 420 to support direct operator interaction with a computer system. Other operator and administrative interfaces can be provided through network connections connected through communication port 460. Components described above are meant only to exemplify various possibilities. In no way should the aforementioned exemplary computer system limit the scope of the present disclosure.

Thus, the present disclosure provides a technical solution for facilitating an effective and concurrent routing and handling of M2M numbers for providing an efficient M2M communication. Several other advantages may be realized.

It would be appreciated that the embodiments herein are explained with respect to network device or CTAS, however, the proposed system and method can be implemented in any computing device or external devices without departing from the scope of the invention.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The patent document includes systems and methods as defined in 3GPP Technical Specification (TS).

Advantages of the Present Disclosure

The present disclosure provides for a system and method that facilitates an effective, concurrent and improved communication between two or more machines.

The present disclosure provides for a system and method that allows machines to initiate and receive calls.

It is an advantage of the present invention that the disclosed method and system provides a cost effective communication.

We claim:

1. A system for facilitating machine to machine (M2M) communication of an entity in a network, the system comprising:
   - at least one converge telephony application server (CTAS) in communication with one or more network devices associated with the network and a centralized database,
   - wherein the at least one CTAS is operatively coupled to a processor, wherein the processor is coupled to a memory, the memory storing instructions on execution of which, the processor causes the at least one CTAS to:
   - receive one or more predefined request signals from a network device of the one or more network devices having a predefined M2M number;
   - identify, based on a pre-defined set of instructions, if the predefined M2M number belongs to a unique group of numbers, wherein only the unique group of numbers avail a plurality of services associated with the M2M communication;
   - invoke, based on the identification, a call leg to initiate communication with the respective plurality of services; and
   - based on the invoked call leg, establish a simultaneous communication of the network device with the plurality of services.

2. The system as claimed in claim 1, wherein the at least one CTAS is configured to capture a calling service in a first database and capture a messaging service in a second database during the invoked call leg.

3. The system as claimed in claim 1, wherein the predefined M2M number has a pre-defined length, and wherein the pre-defined length includes a Mobile Station International Subscriber Directory Number (MSISDN) identification (ID) and a respective country code.

4. The system as claimed in claim 1, wherein the unique group of numbers are stored in the centralized database, wherein each number in the unique group of numbers is associated with a unique user identification (ID), and wherein the unique group of numbers are privileged with incoming and outgoing calls.

5. The system as claimed in claim 1, wherein the unique group of numbers are stored in a pre-defined format that comprises international identification (ID), mobile numbers, and fixed-line numbers.

6. The system as claimed in claim 1, wherein the centralized database comprises pre-defined number of identities associated with a pre-defined service for the unique group of numbers.

7. The system as claimed in claim 6, wherein if no identity is defined under a pre-defined service, then an M2M number is allowed to access the pre-defined service, and wherein incoming calls to the M2M number is allowed from any number.

8. The system as claimed in claim 1, wherein the predefined M2M number has a predefined Registration and Call flow process.

9. The system as claimed in claim 1, wherein a predefined caller ring back tone (CRBT) service is applicable for the predefined M2M number.

10. The system as claimed in claim 1, wherein one or more predetermined services are prevented from being associated with the predefined M2M number though flagging predetermined instances associated with the one or more predetermined services.

11. The system as claimed in claim 1, wherein roaming facilities are unavailable to the predefined M2M number in any network.

12. The system as claimed in claim 1, wherein when the network device with the predefined M2M number dials any valid number, the at least one CTAS checks a called-party number in the centralized database, and wherein if the valid number is found in the centralized database, the at least one CTAS provides call routing treatment.

13. The system as claimed in claim 1, wherein when the network device with the predefined M2M number dials any invalid number, call will be rejected with an error code.

14. The system as claimed in claim 1, wherein if outgoing call is barred for the predefined M2M number, the at least one CTAS responds with a decline with a predefined announcement, and wherein the predefined announcement is mapped with a predetermined internal cause code.

15. The system as claimed in claim 1, wherein when the network device associated with the entity dials the predefined M2M number at an originating leg, the at least one CTAS queries a mobile number portability (MNP) of the dialed M2M number.

16. The system as claimed in claim 15, wherein the query to the MNP returns a domain name of an M2M subscriber, and wherein if location routing number (LRN) is not returned by the MNP, the at least one CTAS does not provide Network-Provided-Routing-Information (NPRI) in the centralized database.

17. The system as claimed in claim 15, wherein if the predefined M2M number belongs to a second entity, the query to the MNP is skipped and the at least one CTAS routes the call to the pre-defined service.

18. The system as claimed in claim 15, wherein the at least one CTAS does not perform CS Domain Routing Number (CSRN) query if an M2M user is not-registered or not-reachable.

19. The system as claimed in claim 1, wherein a predefined priority service is available for the one or more network devices with M2M numbers.

20. A method for facilitating machine to machine (M2M) communication in a network associated with an entity, the method comprising:

receiving, by at least one converge telephony application server (CTAS), one or more predefined request signals from a network device having a predefined M2M number, wherein the at least one CTAS is in communication with one or more network devices associated with the network and a centralized database;

identifying, by the at least one CTAS, based on a predefined set of instructions, if the predefined M2M number belongs to a unique group of numbers, wherein only the unique group of numbers avail a plurality of services associated with the M2M communication;

invoking, by the at least one CTAS, based on the identification, a call leg to initiate communication with the respective plurality of services; and establishing, by the at least one CTAS, based on the invoked call leg, a simultaneous communication of the network device with the plurality of services.

21. The method as claimed in claim 20, comprising capturing, by the at least one CTAS, a calling service in a first database and capturing a messaging service in a second database during the invoked call leg.

22. The method as claimed in claim 20, wherein the predefined M2M number has a pre-defined length, and wherein the pre-defined length includes a Mobile Station International Subscriber Directory Number (MSISDN) identification (ID) and a respective country code.

23. The method as claimed in claim 20, wherein the unique group of numbers are stored in the centralized database, each number in the unique group of numbers being associated with a unique user identification (ID), and wherein the unique group of numbers are privileged with incoming and outgoing calls.

24. The method as claimed in claim 20, wherein the unique group of numbers are stored in a pre-defined format that comprises international identification (ID), mobile numbers, and fixed-line numbers.

25. The method as claimed in claim 20, wherein the centralized database comprises pre-defined number of identities associated with a pre-defined service for the unique group of numbers.

26. The method as claimed in claim 25, wherein if no identity is defined under the pre-defined service, then the predefined M2M number is allowed to access the predefined service, and wherein incoming calls to the predefined M2M number is allowed from any number.

27. The method as claimed in claim 20, wherein the predefined M2M number has a predefined Registration and Call flow process.

28. The method as claimed in claim 20, wherein a predefined caller ring back tone (CRBT) service is applicable for the predefined M2M number.

29. The method as claimed in claim 20, wherein one or more predetermined services are prevented from being associated with the predefined M2M number though flagging predetermined instances associated with the one or more predetermined services.

30. The method as claimed in claim 20, wherein roaming facilities are unavailable to the predefined M2M number in any network.

31. The method as claimed in claim 20, wherein when the network device with the predefined M2M number dials any valid number, the method comprises checking, by the at least one CTAS, a called-party number in the centralized database, and wherein if the valid number is found in the centralized database, the method comprises providing, by the at least one CTAS, call routing treatment.

32. The method as claimed in claim 20, wherein when the network device with the predefined M2M number dials any invalid number, the method comprises rejecting, by the at least one CTAS, call with an error code.

33. The method as claimed in claim 20, wherein if outgoing call is barred for the predefined M2M number, the method comprises responding, by the at least one CTAS, with a decline with a predefined announcement, and wherein the predefined announcement is mapped with a predetermined internal cause code.

34. The method as claimed in claim 20, wherein when the network device associated with the entity dials the predefined M2M number at the originating leg, the method comprises querying, by the at least one CTAS, a Mobile number portability (MNP) of the dialed M2M number.

35. The method as claimed in claim 34, wherein the query to the MNP returns a domain name of an M2M subscriber, and wherein if location routing number (LRN) is not returned by the MNP, the method comprises discarding, by the at least one CTAS, Network-Provided-Routing-Information (NPRI) in the centralized database.

36. The method as claimed in claim 34, wherein if the predefined M2M number belongs to a second entity, the query to the MNP is skipped, and the method comprises routing, by the at least one CTAS, the call to the pre-defined service.

37. The method as claimed in claim 34, comprising ignoring, by the at least one CTAS, a CSRN query if an M2M user is not-registered or not-reachable.

38. The method as claimed in claim 20, wherein a pre-defined priority service is available for the one or more network devices with M2M numbers.

39. A non-transitory computer readable medium comprising machine-executable instructions that are executable by a processor to:

receive one or more predefined request signals from a network device having a predefined machine to machine (M2M) number;

identify, based on a pre-defined set of instructions, if the predefined M2M number belongs to a unique group of numbers, wherein only the unique group of numbers avail a plurality of services associated with M2M communication;

invoke, based on the identification, a call leg to initiate communication with the respective plurality of services; and based on the invoked call leg, establish a simultaneous communication of the network device with the plurality of services.

* * * * *